US009930725B2

(12) United States Patent
Mow et al.

(10) Patent No.: US 9,930,725 B2
(45) Date of Patent: Mar. 27, 2018

(54) WIRELESS ELECTRONIC DEVICE WITH MULTIRADIO CONTROLLER INTEGRATED CIRCUIT (71) Applicant: Apple Inc., Cupertino, CA (US)

(72) Inventors: Matthew A. Mow, Los Altos, CA (US); Mattia Pascolini, San Francisco, CA (US); Thomas E. Biedka, San Jose, CA (US); Liang Han, Sunnyvale, CA (US); Ming-Ju Tsai, Cupertino, CA (US); Victor Lee, Sunnyvale, CA (US); James G. Judkins, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/967,772

(22) Filed: Dec. 14, 2015

(65) Prior Publication Data
US 2016/0174293 A1    Jun. 16, 2016

Related U.S. Application Data (60) Provisional application No. 62/092,729, filed on Dec. 16, 2014.

(51) Int. Cl.
*H04W 88/06*    (2009.01)
*H04B 1/00*    (2006.01)
(Continued)

(52) U.S. Cl.
CPC .......... *H04W 88/06* (2013.01); *H04B 1/0053* (2013.01); *H04B 1/3827* (2013.01);
(Continued)

(58) Field of Classification Search
CPC ..... H04W 48/18; H04W 48/16; H04W 88/06; H04W 84/042; H04W 84/12; H04Q 9/00;
(Continued)

(56) References Cited

U.S. PATENT DOCUMENTS

| 5,519,691 | A  | * | 5/1996 | Darcie | H04W 88/00 370/331 |
| 7,280,810 | B2 | * | 10/2007 | Feher | H04M 3/382 370/208 |

(Continued)

FOREIGN PATENT DOCUMENTS

| CN | 1969463 A | 5/2007 |
| CN | 101588608 A | 11/2009 |

(Continued)

*Primary Examiner* — Joseph Dean, Jr.
(74) *Attorney, Agent, or Firm* — Treyz Law Group, P.C.; G. Victor Treyz; David K. Cole (57) ABSTRACT An electronic device may be provided with wireless circuitry. An application processor may generate wireless data that is to be transmitted using the wireless circuitry and may process wireless data that has been received using the wireless circuitry. The wireless circuitry may include multiple baseband processors, multiple associated radios, and front-end module and antenna circuitry. Sensors may be used to provide the application processor with sensor data. During operation, the application processor and the baseband processors may be used to transmit and receive wireless communications traffic. A multiradio controller integrated circuit that does not transmit or receive the wireless communications traffic may be used in controlling the wireless circuitry based on impedance measurements, sensor data, and other information.

25 Claims, 4 Drawing Sheets (51) Int. Cl.
  *H04B 17/10*     (2015.01)
  *H04B 1/3827*    (2015.01)
  *H04L 25/02*     (2006.01)
  *H04W 84/12*     (2009.01)
  *H04W 84/04*     (2009.01)

(52) U.S. Cl.
  CPC ......... *H04B 17/102* (2015.01); *H04B 17/104* (2015.01); *H04L 25/0264* (2013.01); *H04W 84/042* (2013.01); *H04W 84/12* (2013.01)

(58) Field of Classification Search
  CPC ........... H04Q 2209/43; H04Q 2209/47; H04B 1/0053; H04B 17/102; H04B 17/104; H04B 1/3827; H04L 25/0264
  See application file for complete search history.

(56) References Cited

U.S. PATENT DOCUMENTS

| | | | |
|---|---|---|---|
| 7,333,829 | B2 | 2/2008 | Malone et al. |
| 9,049,745 | B2 | 6/2015 | Mujtaba et al. |
| 9,119,222 | B2 | 8/2015 | Krishnaswamy et al. |
| 2007/0265036 | A1* | 11/2007 | Kawasaki ........... H04M 1/7253 455/562.1 |
| 2008/0200120 | A1 | 8/2008 | Ruuska et al. |
| 2009/0245221 | A1* | 10/2009 | Piipponen ............. H04W 88/06 370/343 |
| 2010/0113090 | A1 | 5/2010 | Lin et al. |
| 2013/0155931 | A1 | 6/2013 | Prajapati et al. |
| 2015/0055516 | A1* | 2/2015 | Smadi ............... H04W 72/1215 370/280 |
| 2015/0245217 | A1 | 8/2015 | Weaver et al. |

FOREIGN PATENT DOCUMENTS

| | | |
|---|---|---|
| CN | 103051352 A | 4/2013 |
| EP | 2472728 B1 | 11/2013 |
| JP | 2009-147956 A | 7/2009 |
| JP | 2009147956 A | 7/2009 |
| JP | 2010141690 A | 6/2010 |
| JP | 2012065321 A | 3/2012 |
| JP | 2014-123919 A | 7/2014 |
| JP | 2014230279 A | 12/2014 |
| KR | 10-2012-0006404 | 1/2012 |
| WO | 2011024280 A1 | 3/2011 |
| WO | 2011110108 | 9/2011 |

* cited by examiner

WIRELESS ELECTRONIC DEVICE WITH MULTIRADIO CONTROLLER INTEGRATED CIRCUIT

This application claims the benefit of provisional patent application No. 62/092,729 filed on Dec. 16, 2014, which is hereby incorporated by reference herein in its entirety.

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It can be challenging to ensure that wireless communications circuitry in an electronic device will perform satisfactorily in all operating conditions. For example, the operating environment of an electronic device may affect antenna performance or the simultaneous use of two different communications bands within a device may give rise to a potential for interference.

These potential performance issues can be exacerbated in certain wireless communications circuit architectures. In some devices, multiple baseband processors are used each of which handles a different type of wireless communications. The operation of these different baseband processors and other wireless circuits may often be poorly coordinated. This can give rise to conflicts. For example, wireless performance may suffer if a cellular telephone baseband processor is being used to transmit and receive cellular telephone traffic while a wireless local area network baseband processor is being used to transmit and receive wireless local area network traffic. Unless care is taken, the wireless performance of an electronic device may not be satisfactory under certain operating conditions.

It would therefore be desirable to be able to provide improved wireless circuitry for operating electronic devices.

SUMMARY

An electronic device may be provided with wireless circuitry. An application processor may generate wireless data that is to be transmitted using the wireless circuitry and may process wireless data that has been received using the wireless circuitry. Sensors may be used to provide the application processor with sensor data.

The wireless circuitry may include multiple baseband processors, multiple associated radios, and front-end module and antenna circuitry. The wireless circuitry may be coupled to the application processor. The baseband processors may be coupled to the application processor using a digital signal bus or other communications path. Digital and analog signal paths may be used to couple baseband processors and radios. Front-end module circuitry and antenna circuitry may be coupled to the radios. The front-end module circuitry and antenna circuitry may be tunable.

During operation, the application processor and the baseband processors may be used to transmit and receive wireless communications traffic. A multiradio controller integrated circuit that does not transmit or receive the wireless communications traffic may be used in controlling the wireless circuitry based on impedance measurements, sensor data, and other information. The multiradio controller integrated circuit may be coupled to a digital signal bus between the application processor and baseband processors and may be coupled to other portions of the wireless circuitry. The multiradio controller integrated circuit may control the baseband processors, may tune antennas and front-end modules, may adjust radio output powers, and may make other adjustments to the operating settings of the wireless circuitry to optimize wireless performance.

DETAILED DESCRIPTION

Figure 1:
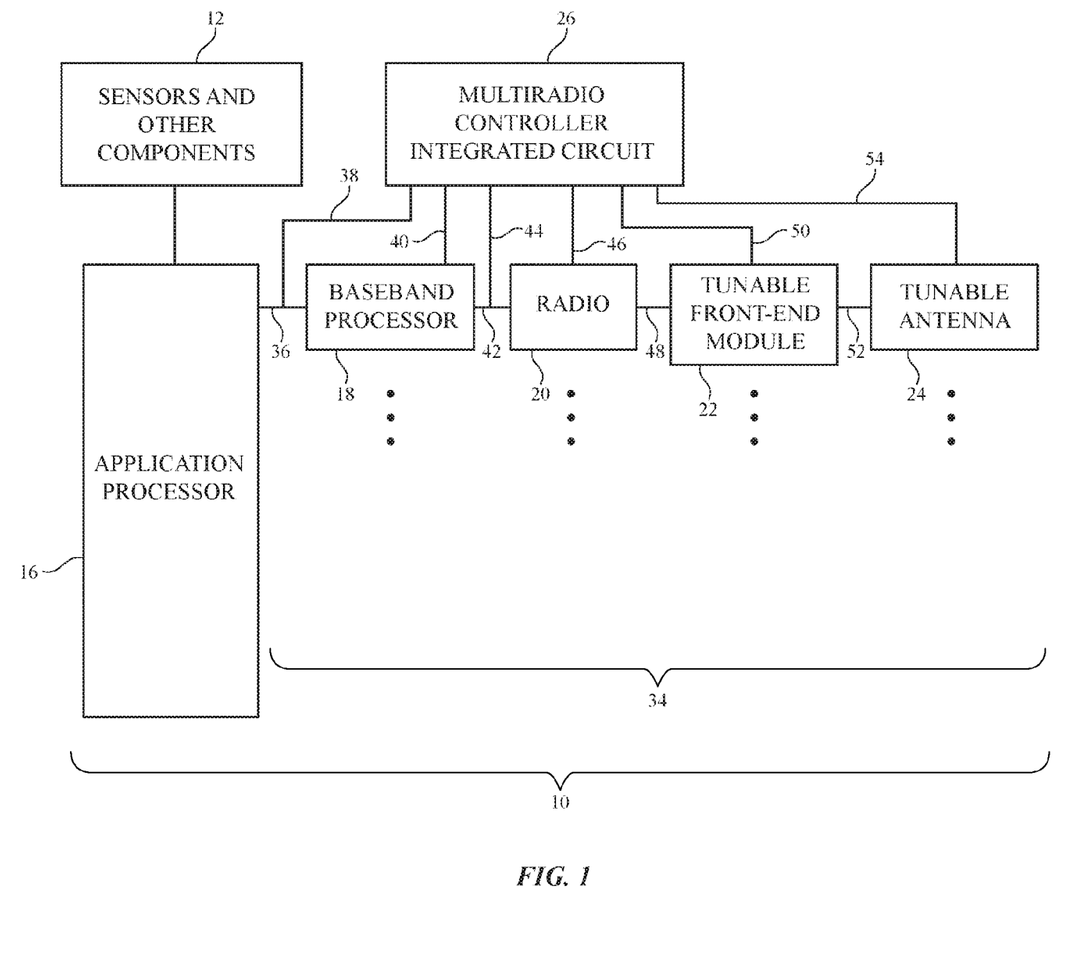
FIG. 1 is a schematic diagram of an illustrative electronic device with wireless communications in accordance with an embodiment.

An electronic device such as electronic device 10 of FIG. 1 may contain wireless circuitry. Device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment is mounted in a kiosk or automobile, equipment that implements the functionality of two or more of these devices, or other electronic equipment.

Device 10 may contain wireless circuitry 34 for communicating in one or more communications bands. Device 10 may, for example, contain wireless communications circuitry that operates in long-range communications bands such as cellular telephone bands (e.g., bands at frequencies between 700 MHz to 2800 MHz or other suitable frequencies) and wireless circuitry that operates in short-range communications bands such as the 2.4 GHz Bluetooth® band and the 2.4 GHz and 5 GHz WiFi® wireless local area network bands (sometimes referred to as IEEE 802.11 bands or wireless local area network communications bands). Device 10 may also contain wireless communications circuitry for implementing near-field communications, satellite navigation system communications (e.g., global positioning system communications), or other wireless communications.

Device 10 may have multiple baseband processor integrated circuits such as baseband processors 18. Each baseband processor may be used in handling a different type of wireless communications traffic. For example, a first baseband processor may be used for cellular telephone communications, a second baseband processor may be used for wireless local area network communications, a third baseband processor may be used to handle global positioning system (GPS) satellite navigation signal, a fourth baseband processor may be used to handle near-field communications, and additional baseband processors may handle additional types of wireless communications. Each baseband processor contains hardwired circuitry that accelerates wireless communications tasks (e.g., implementation of computationally intensive signal processing algorithms) that would be impractical to handle on a general purpose processor such as application processor 16.

Each baseband processor may operate in conjunction with an associated wireless transceiver circuit such as one of radios 20 and an associated front-end module such as one of tunable front-end modules 22. Antennas such as tunable antennas 24 may be used to transmit and receive wireless signals. There may be an antenna associated with each front-end module 22 and radio 20 and/or front-end circuitry and antenna circuitry may be shared between multiple baseband processors and radios. For example, switching circuitry may be interposed in the paths between radios 20 and antennas 24. The switching circuitry (which may sometimes be referred to as port switching circuitry) may be adjusted to switch particular antennas into or out of use to optimize wireless performance. For example, the switching circuitry may route signals from a given baseband processor to either a first antenna or a second antenna.

Device 10 may use multiradio controller integrated circuit 26 to control the operation of wireless circuitry such as baseband processors 18, radios 20, tunable front-end modules 22, and tunable antennas 24 (e.g., to adjust operating settings for processors 18, to adjust output powers for radios 20, to adjust tuning settings for modules 22 and antennas 24, etc.). Multiradio controller integrated circuit 26 need not contain circuitry for handling transmitted or received wireless data traffic (i.e., controller 26 need not handle the operations associated with the wireless protocol stack or signal processing algorithms for the data traffic), as wireless communications traffic is handled by the processor resources and hardwired signal processing resources of baseband processors 18.

The use of integrated circuit 26 to control wireless circuit operations for processors 18, radios 20, and other wireless circuitry such as modules 22 and antennas 24 helps centralize control operations that might otherwise be formed by different baseband modules without significant coordination. Because integrated circuit 26 can perform control operations in a centralized fashion, control code may be developed for integrated circuit 26 that is independent of the particular resources of any given baseband processor 18. The may help allow baseband processors 18 to be upgraded to newer models with less disruption to the architecture and operation of device 10 than might otherwise be possible. The capabilities of integrated circuit 26 may also be used to relieve application processor 16 from processing tasks that might be difficult or impossible to execute satisfactorily implement using software running on application processor 16 (e.g., real time wireless circuit adjustments such as changes to antenna tuning, giving one radio such as a cellular radio a higher priority than another radio such as a wireless local area network radio when transmitting and receiving wireless data traffic, adjusting output powers from radios, etc.).

Device 10 may include input-output devices such as components 12. Components 12 may include input-output devices that allow data to be supplied to device 10 and that allow data to be provided from device 10 to external devices. The input-output devices may include user interface devices, data port devices, and other input-output components. For example, the input-output devices may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors (e.g., a capacitive proximity sensor and/or an infrared proximity sensor), magnetic sensors, connector port sensors that determine whether a connector such as an audio jack and/or digital data connector have been inserted in a connector port in device 10, a connector port sensor or other sensor that determines whether device 10 is mounted in a dock, a connector interface circuit or other circuitry that monitors for the presence of connectors and identifies which type of connector has been plugged in, a sensor that measures a resistor or other circuit in a connector plug that serves as an accessory identifier, other sensors for determining whether device 10 is coupled to an accessory and/or for determining what type of connector and/or other accessory is coupled to device 10, and other sensors and input-output components. Application processor 16 and multiradio controller integrated circuit 26 may gather information from sensors and other devices in components 12 and may supply output via components 12.

Application processor 16 may be a system-on-chip integrated circuit or other processor integrated circuit. Application processor 16 may be used to execute code such as operating system code and application software. During operation of device 10, application processor 16 may use components 12 to gather input from a user, environmental sensors, and other circuits. The input may be processed by application processor 16 and suitable output data provided. The output data that is generated by application processor 16 may be presented to a user, may be transmitted over a wired communications path, or may be wirelessly transmitted using wireless circuitry 34. Application processor 16 may also be used to process data that has been wirelessly received using wireless circuitry 34.

Application processor 16 may communicate with baseband processors over respective paths 36. Baseband processors 18 may communicate with respective radios 20 over corresponding paths 42. Paths 36 and 42 may be digital communications buses and/or analog signal paths. Examples of digital communications buses that may be used for paths 36 and 42 include the Peripheral Component Interconnect Express (PCIE) bus, the RF Front-End Control Interface (RFFE) bus, the Serial Peripheral Interface (SPI) bus, the Universal Serial Bus (USB) bus, a local area network (LAN) bus such as an Ethernet bus, etc.

Multiradio controller integrated circuit 26 may be coupled into the buses between application processor 16 and baseband processors 18 such as buses 36 using paths 38. Multiradio controller integrated circuit may also be coupled into digital signal buses or other communications paths between baseband processors 18 and respective radios 20 using corresponding paths such as paths 44.

If desired, multiradio controller integrated circuit 26 may communicate with baseband processors 18 using paths such as paths 40 (e.g., digital signal paths). Paths 40 may be coupled directly to pins on processors 18 or may be tap into digital signal bus 36 as illustrated by paths 38. Multiradio controller integrated circuit 26 may communicate with radios 20, tunable front-end modules 22, and tunable antennas 24 using respective paths 46, 50, and 54. Paths such as paths 46 may each be coupled directly to a respective radio 20 or may be coupled to a bus between radio 20 and other circuitry (e.g., path 46 may be coupled to path 42 as illustrated by path 44). Paths 48 and 52 (e.g., transmission lines) may be used to couple radios 20 to front-end modules 22 and to couple front-end modules 22 to antennas 24. Switching circuitry (e.g., port switches) may be coupled in paths such as paths 48 and/or 52 to allow desired antennas and front-end circuits to be switched into and out of use.

During operation, multiradio controller integrated circuit 26 may gather information from sensors and other components 12, baseband processors 18, and other wireless circuitry 34 and may use this information in determining how to adjust the controllable components of wireless circuitry 34 (e.g., how to adjust baseband processors 18 and radios 20, how to adjust tunable front-end modules 22 and tunable antennas 24, etc.). The wireless performance of device 10 may be characterized in advance (e.g., during testing) to determine which wireless circuit settings are optimum to use in a variety of operating environments (e.g., environments in which antennas are potentially blocked or detuned due to the presence of external objects), a variety of coexistence scenarios (i.e., scenarios in which device 10 is transmitting and/or receiving wireless traffic in multiple bands), a variety of different radio output power settings, a variety of different filter settings or other adjustable settings for front-end modules 22, a variety of different device orientations (portrait, landscape, etc.), a variety of different connector port scenarios (e.g., scenarios in which an audio plug or other connector is or is not plugged into mating connectors in device 10), etc. Based on these characterization operations and based on real-time information gathered from sensors, radios, etc., multiradio controller integrated circuit 26 may make real time adjustments to wireless circuitry 34 that optimize the wireless performance of circuitry 34 (e.g., to mitigate interference effects, to retune antennas, to adjust filter settings to enhance isolation, to adjust output powers to ensure that regulatory limits on emitted radiation are satisfied, etc.).

As an example, consider a scenario in which it is desired to use device 10 to handle cellular telephone traffic in cellular telephone band BC10 while handling WiFi® traffic at 2.4 GHz. Cellular telephone traffic may be handled using a cellular telephone baseband processor and wireless local area network traffic may be handled using a wireless local area network baseband processor. The third harmonic of the BC10 band may fall in the 2.4 GHz band, which has the potential to cause undesired interference between cellular traffic and wireless local area network traffic. Using multiradio controller integrated circuit 26, however, integrated circuit 26 can determine when the power levels and frequencies of operation of the cellular circuitry and wireless local area network circuitry might create potential interference and can act accordingly. In particular, integrated circuit 26 can take corrective action by adjusting front-end modules 22 to switch additional filtering into use, by adjusting the output powers of the cellular telephone radio and/or wireless local area network radio, by adjusting the settings of the cellular telephone and wireless local area network baseband processors, or by otherwise adjusting circuitry 34 (e.g., to increase isolation between radios, to fully or partly suppress an aggressor signal so that operations at a victim frequency are not disrupted, etc.).

Because multiradio controller integrated circuit 26 is available for performing control operations (e.g., operations that involve managing the settings for multiple different types of wireless communications traffic), the need for software in baseband processors 18 to control wireless circuitry 34 (e.g., tunable circuits in front-end modules 22, antennas 24, basebands and radios, etc.) may be reduced. Rather, integrated circuit 26 may perform control operations on the radios and other resources of circuitry 34 while taking account of the presence of multiple radios 20. Integrated circuit 26 may, for example, reduce output powers, increase filtering, adjust data rates, activate and deactivate baseband operations, tune filters, tune antennas, switch antennas, adjust which channels or bands are being used, or may take other appropriate actions to adjust the operating settings for circuitry 34 when it is determined that both cellular band BC10 and wireless local area network communications at 2.4 GHz will be active.

Figure 2:
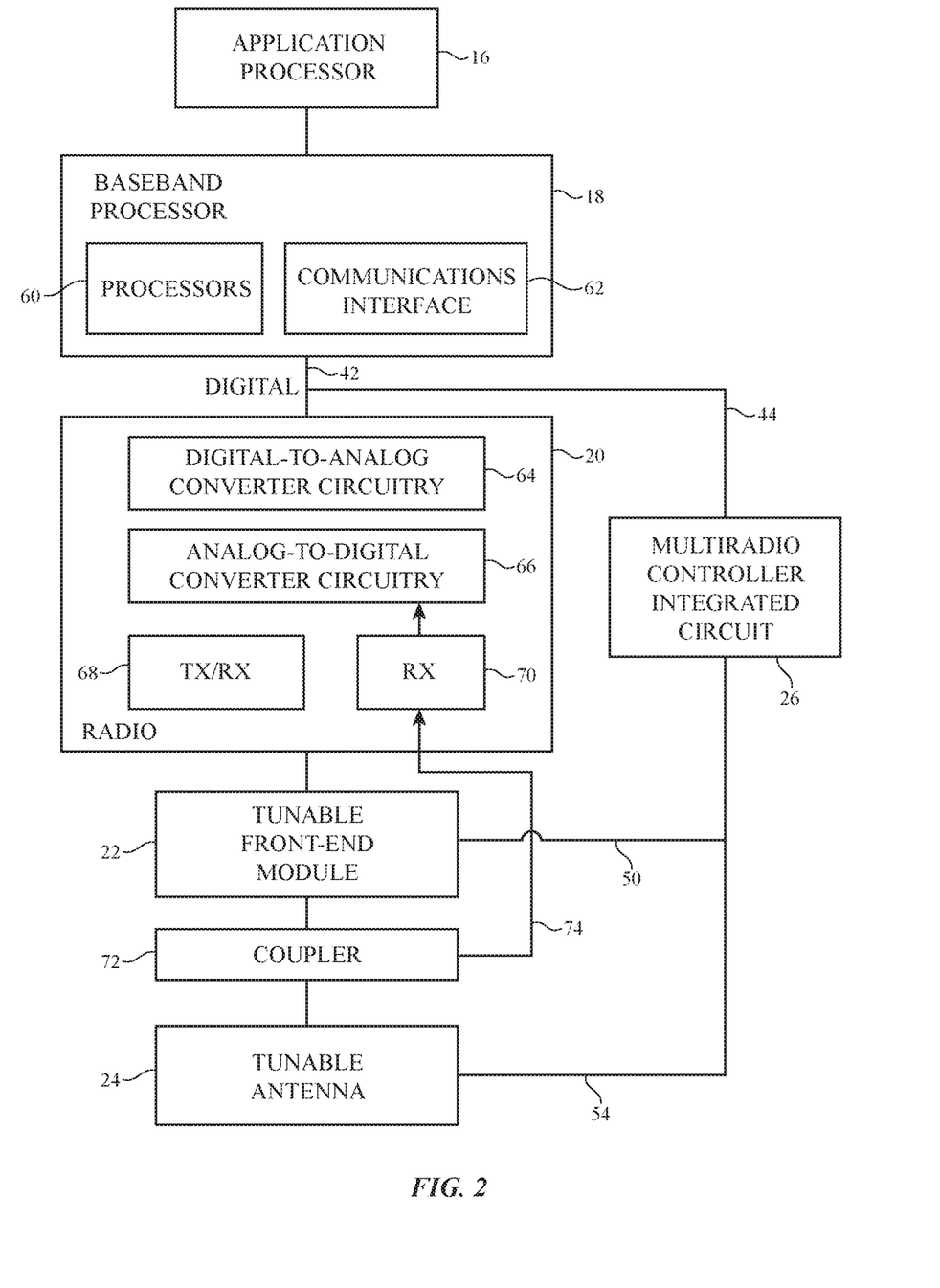
FIG. 2 is a schematic diagram of illustrative wireless communications circuitry in which a multiradio controller integrated circuit receives information from a digital bus between a baseband processor and a transceiver integrated circuit that is used in adjusting wireless circuitry in accordance with an embodiment.

FIG. 2 is a diagram of an illustrative branch of wireless circuitry 34 (e.g., an illustrative baseband processor 18, radio 20, and associated wireless circuitry) in which communications between baseband processor 18 and radio 20 are handled using a digital bus (bus 42). As shown in FIG. 2, baseband processor 18 may have processors 60 and communications interface 62. Processors 60 may be used in implementing upper layer communications protocols (i.e., protocols above the physical layer in the wireless protocol stack). Physical layer processing activities may be handled by hardwired circuitry in baseband processor 18 (e.g., circuitry that is configured to handle computationally intensive activities such as computationally intensive signal processing algorithms). Communications interface 62 may be used by processor 18 to support digital communications with radio 20 over digital bus 42. During operation, radio 20 may place baseband signals from processor 18 that are to be transmitted on a desired carrier frequency band and may extract incoming signals from a carrier frequency band (i.e., signals received from antenna 24 and module 22) so that those extracted baseband signals can be provided to baseband processor 18.

Radio 20 may have transceiver circuitry such as transceiver 68 for transmitting and receiving radio-frequency signals through front-end module 22 and antenna 24. Front-end module 22 may contain impedance matching circuitry and filter circuitry. Antenna 24 may contain an antenna resonating element such as an inverted-F antenna resonating element, a slot antenna resonating element, a patch antenna resonating element, a loop antenna resonating element, monopole antenna structures, dipole antenna structures, near-field communications antenna structures, or other antenna structures. Module 22 and antenna 24 may contain tunable circuitry (e.g., tunable inductors, capacitors, resistors, switches, etc.). Integrated circuit 26 can tune module 22 (e.g., to tune filter circuitry and/or impedance matching circuitry) by providing control signals to the tunable circuitry of module 22 on path 50 and can tune tunable antenna 24 by providing control signals to the tunable circuitry of antenna 24 on path 54.

Radio 20 may have digital-to-analog converter circuitry 64 to convert digital signals from bus 42 into corresponding analog signals to provide to transceiver 68 and may have analog-to-digital converter circuitry 66 to convert analog signals from transceiver 68 to digital signals for bus 42.

Radio 20 and coupler 72 may be used in making impedance measurements (e.g., S-parameter measurements). During impedance measurements, radio 20 may transmit signals toward antenna 24. Transmitted signals may be reflected from antenna 24. Directional coupler 72 may be configured to tap into the transmitted and reflected signals passing between tunable front-end module 22 and tunable antenna 24 (or a coupler such as coupler 72 may be incorporated into other portions of wireless circuitry 34). Receiver circuitry 70 may receive signals from directional coupler 72 via path 74 (e.g., signals from transceiver 68 and/or antenna 24 depending on the state of switching circuitry in coupler 72). By processing the signal measurements made using receiver 70, the impedance of antenna 24 (or other suitable portion of wireless circuitry 34) may be determined. The impedance measurements that are made in this way using radio 20 and coupler 72, may be used in determining whether antenna 24 has been detuned due to the presence of external objects in the vicinity of antenna 24 or other environmental factors.

In general, directional couplers such as coupler 72 may be used to provide real-time impedance information on any suitable portion of wireless circuitry 34 (e.g., the impedance of a portion of antenna 24, the impedance of a matching circuit, the impedance of a transmission line, etc.). With an arrangement of the type shown in FIG. 2, impedance data (e.g., S-parameter measurements for calculating antenna impedance) may be provided from receiver 70 to analog-to-digital converter circuitry 66, which may in turn provide a corresponding digital antenna impedance output value to digital path 42 (e.g., an RFFE bus or other digital bus). This antenna impedance information may be used by baseband processor 60 and by multiradio controller integrated circuitry 26, which receives this digital information from bus 42 using path 44 (e.g., a path that is coupled to bus 42). Antenna impedance information may also be provided from radio 20 to integrated circuit 26 using other signal paths.

Figure 3:
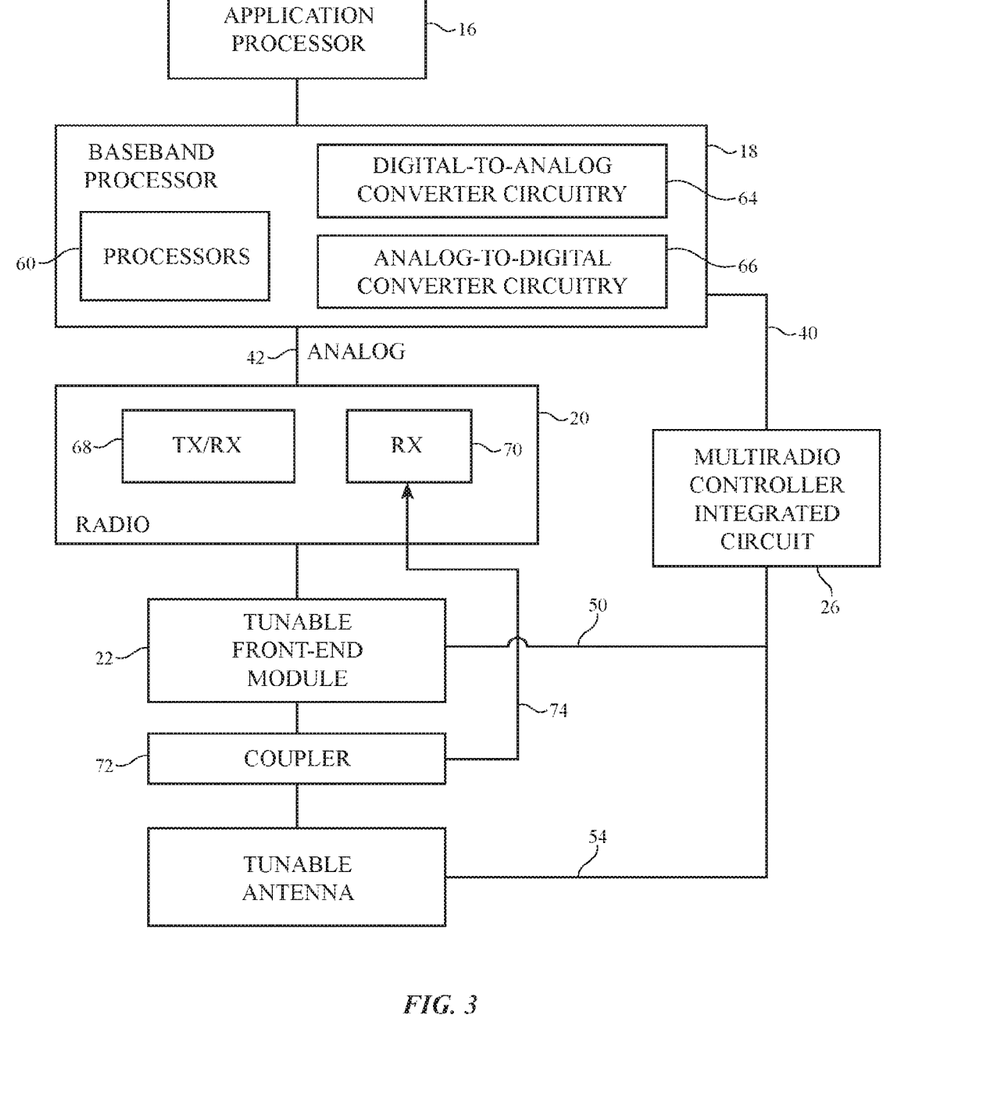
FIG. 3 is a schematic diagram of illustrative wireless communications circuitry in which a multiradio controller integrated circuit receives information from a baseband processor to use in adjusting wireless circuitry in accordance with an embodiment.

With the illustrative configuration shown in FIG. 3, digital-to-analog converter circuitry 64 and analog-to-digital converter circuitry 66 are implemented as part of baseband processor 18 rather than radio 20 and baseband processor 18 and radio 20 communicate using analog signals conveyed over path 42. In this situation, antenna impedance measurements from coupler 72 and receiver 70 may be conveyed to analog-to-digital converter 66 via analog path 42 and may be conveyed to multiradio controller integrated circuit 26 via path 40 between baseband processor 18 or a path such as path 38 that is coupled to bus 36 of FIG. 1. If desired, a mixture of configurations of the type shown in FIG. 2 and configurations of the type shown in FIG. 3 and, if desired, other communications path arrangements may be used by multiradio controller integrated circuit 26 in gathering information and controlling circuits in wireless circuitry 34 of FIG. 1. For example, path 46 of FIG. 1 may be coupled to a communications interface in radio 20 and may be used to convey information between radio 20 and integrated circuit 26. The configurations of FIGS. 1 and 2 are merely illustrative.

Figure 4:
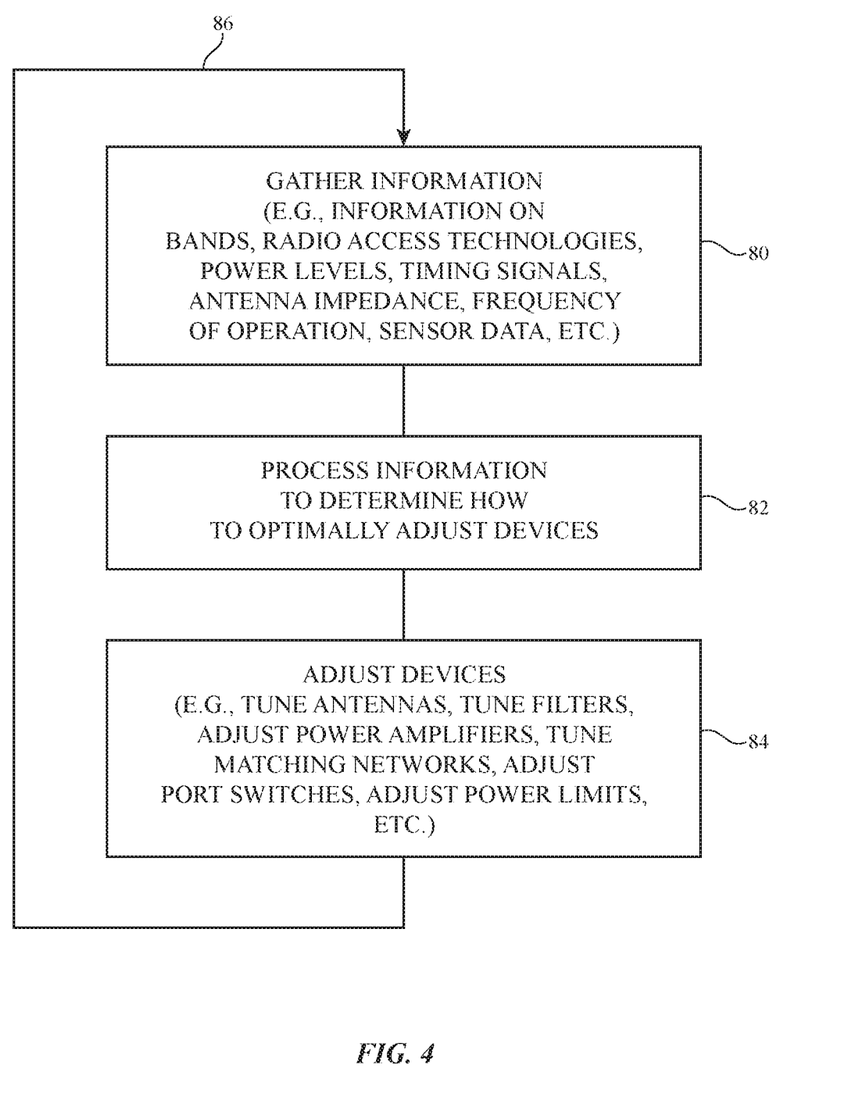
FIG. 4 is a flow chart of illustrative steps involved in operating an electronic device with a multiradio controller integrated circuit in accordance with an embodiment.

Illustrative steps involved in operating a device with a multiradio controller integrated circuit are shown in FIG. 4.

At step 80, multiradio controller integrated circuit 26 in device 10 may gather information on the operating environment of device 10 and the state of wireless circuitry 34. Integrated circuit 26 may gather information from sensors and other components 12, may gather information from application processor 16, may gather antenna impedance information or other impedance information, received signal strength information, and other information on wireless performance from baseband processor 18, may gather information from path 36 or path 42 or other path coupling the circuits of wireless circuitry 34 together, or may gather information from other portions of the circuitry of device 10. Integrated circuit 26 may gather information on which communication band(s) are currently being used, which radio access technologies are being used, which communications frequencies (channels) are being used, which transmit power levels are being used, which timing signals are being used (e.g., timing information such as frame boundary information, clock information, trigger signal information that informs circuit 26 when to adjust power amplifiers and when to tune bands), and other information on the operation of wireless circuitry 34 (e.g., information associated with the operation of baseband processors 18, radios 20, etc.). Integrated circuit 26 may also gather information from sensors 12 on the operating environment of device 10 (e.g., information form a proximity sensor on the proximity of external objects to antennas 24, information on the orientation of device 10 relative to Earth from an accelerometer, etc.). Sensor signals may be provided directly to integrated circuit 26 from sensors 12 and/or may be gathered from application processor 16 (e.g., using path 38). Coupler 72 and receiver 70 may be used in providing integrated circuit 26 with real time information on antenna impedance for each of the antennas in device 10.

If desired, integrated circuit 26 may gather information on the status of switches in circuitry 34 (e.g., the status of switches that are used in switching desired antennas and/or antenna ports into use in circuitry 34). Sensors 12 may provide information on which connectors are plugged into connector ports in device 10 and other information on the presence of conductive structures (e.g., connector plugs, docking stations, etc.) that may affect wireless performance.

At step 82, integrated circuit 26 may process the information gathered at step 80. Integrated circuit 26 may, for example, apply the information gathered at step 80 to look-up tables, databases, and control algorithms developed during performance characterization and optimization operations. These operations may, for example, be used to identify optimum settings for device 10 under various different operating scenarios such as scenarios involving potential interference between radios, scenarios involving external objects in proximity to device 10, scenarios involving different types of communications traffic, etc. The processing operations of step 82 may be used to identify optimum settings for wireless circuitry 34. These settings may avoid interference, maximize throughput of high-priority traffic, ensure regulatory limits on emitted radiation levels are satisfied, and may otherwise ensure that device 10 operates optimally.

At step 84, the optimal operating settings that were identified at step 82 may be applied to circuitry 34. In particular, integrated circuit 26 may adjust tunable antennas 24 (e.g., to adjust the impedance of antennas 24 or parts of antennas 24), may adjust impedance matching circuitry and filters in tunable front-end modules 22, may adjust tunable power amplifiers in circuitry 22 (and amplifiers in radios 20), may adjust switch settings to route signals between desired radio(s) and antenna(s), may adjust which radio access technologies are being used, may tune to desired communications bands, may tune to desired frequencies (communications channels) within bands, may adjust output powers for transmitted signals, may adjust transmission rates, may activate and deactivate particular communications bands, channels, and/or radios 20, or may otherwise adjust the performance of components 12 and/or the components of wireless circuitry 34.

As indicated by line 86, the processes of FIG. 4 may be performed continuously to ensure that device 10 is operated in an optimum fashion under a variety of different operating conditions.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
    an application processor that generates data that is to be wirelessly transmitted and that uses data that has been wirelessly received;
    wireless circuitry with which the application processor wirelessly transmits and receives the data;
    a first baseband processor and a first radio in the wireless circuitry that handle wireless communications traffic in a first communications band;
    a second baseband processor and a second radio in the wireless circuitry that handle wireless communications traffic in a second communications band;
    a multiradio controller integrated circuit that is coupled to the wireless circuitry, the first baseband processor, the second baseband processor, the first radio, and the second radio over respective control paths, wherein the multiradio controller integrated circuit does not receive wireless communications traffic;
    an antenna; and
    a directional coupler that is coupled to a receiver in the first radio and that is used in measuring an antenna impedance for the antenna, wherein the multiradio controller integrated circuit receives the measured antenna impedance from the first radio.

2. The electronic device defined in claim 1 wherein the first and second baseband processors communicate with the application processor over a digital bus and wherein the multiradio controller integrated circuit is coupled to the digital bus.

3. The electronic device defined in claim 2 wherein the antenna is a tunable antenna that is adjusted by the multiradio controller integrated circuit.

4. The electronic device defined in claim 3 wherein the first baseband processor communicates with the first radio over a digital signal path.

5. The electronic device defined in claim 4 wherein the multiradio controller integrated circuit is coupled to the digital signal path.

6. The electronic device defined in claim 5 further comprising a tunable front-end module that is interposed between the first radio and the tunable antenna, wherein the multiradio controller integrated circuit adjusts the tunable front-end module.

7. The electronic device defined in claim 4 wherein the measured antenna impedance is provided to the digital signal path from the first radio and is received by the multiradio controller integrated circuit from the digital signal path.

8. The electronic device defined in claim 3 wherein the first baseband processor communicates with the first radio over an analog signal path.

9. The electronic device defined in claim 8 wherein the multiradio controller integrated circuit is coupled to the first baseband processor by a digital signal path.

10. The electronic device defined in claim 9 wherein the measured antenna impedance is provided to the first baseband processor over the analog signal path and is received by the multiradio controller integrated circuit over the digital signal path between the multiradio controller and the first baseband processor.

11. The electronic device defined in claim 1 further comprising:
    a tunable front-end module that is interposed between the first radio and the antenna.

12. The electronic device defined in claim 11 wherein the multiradio controller integrated circuit is configured to adjust the tunable front-end module.

13. The electronic device defined in claim 1 wherein the first baseband processor comprises a cellular telephone baseband processor.

14. The electronic device defined in claim 13 wherein the second baseband processor comprises a wireless local area network baseband processor.

15. The electronic device defined in claim 14 wherein the antenna is a tunable antenna that is adjusted by the multiradio controller integrated circuit.

16. The electronic device defined in claim 15 further comprising:
    at least one sensor, wherein the multiradio controller integrated circuit adjusts the tunable antenna based at least partly on information from the sensor.

17. The electronic device defined in claim 1 wherein the multiradio controller integrated circuit uses the directional coupler to measure an antenna impedance.

18. A method of operating an electronic device, the method comprising:
    with an application processor in the electronic device, wirelessly transmitting and receiving wireless data traffic using first and second baseband processors, wherein the electronic device comprises wireless circuitry coupled to the applications processor and the wireless circuitry includes first and second front-end modules and the first and second baseband processors; and
    adjusting the wireless circuitry with a multiradio controller integrated circuit that does not transmit or receive wireless data traffic, wherein adjusting the wireless circuitry comprises adjusting the first and second front-end modules to change a filter setting of at least one antenna.

19. The method defined in claim 18 wherein adjusting the wireless circuitry comprises adjusting the first and second baseband processors.

20. The method defined in claim 19 wherein the at least one antenna is a tunable antenna and wherein adjusting the wireless circuitry comprises adjusting the tunable antenna.

21. The method defined in claim 20 wherein the electronic device includes sensors that provide sensor information to the application processor and wherein adjusting the wireless circuitry comprises adjusting the tunable antenna based on the sensor information.

22. The method defined in claim 18 wherein adjusting the wireless circuitry comprises:
    with the multiradio controller integrated circuit, adjusting a parameter selected from the group consisting of: a wireless transceiver output power, an antenna tuning, a front-end module tuning, and a switch that selects an antenna for use by the wireless circuitry to transmit and receive the wireless data traffic.

23. The method defined in claim 18 further comprising:
    with the multiradio controller integrated circuit, measuring an antenna impedance using information gathered by a directional coupler.

24. An electronic device, comprising:
    an application processor;
    wireless circuitry with which the application processor transmits and receives wireless communications traffic, wherein the wireless circuitry includes at least a cellular telephone baseband processor, a cellular telephone radio coupled to the cellular telephone baseband processor, a wireless local area network baseband processor, and a wireless local area network radio coupled to the wireless local area network baseband processor;

at least one tunable antenna with which the wireless circuitry transmits and receives the wireless communications traffic;

a multiradio controller integrated circuit that controls the cellular telephone baseband processor and the wireless local area network baseband processor and that does not receive or transmit the wireless communications traffic; and a directional coupler with which the multiradio controller integrated circuit measures an antenna impedance.

25. The electronic device defined in claim 24 wherein the multiradio controller tunes the at least one tunable antenna based at least partly on the measured antenna impedance.

* * * * *